United States Patent
Kini et al.

(10) Patent No.: US 12,441,972 B2
(45) Date of Patent: Oct. 14, 2025

(54) SYSTEMS AND METHODS FOR PROBE ANGLE ADJUSTMENT IN BIOREACTORS

(71) Applicant: Cytiva Sweden AB, Uppsala (SE)

(72) Inventors: Prasad Yakkar Kini, Bengaluru (IN); Shashikanth Agnihotry, Bengaluru (IN); Sarath Chandra N, Bengaluru (IN); Vinodkumar Mukuntharaj, Bengaluru (IN); Sairam C, Bengaluru (IN); Prasad Bagiyanathan, Bengaluru (IN); Kandakumar M., Bengaluru (IN)

(73) Assignee: Cytiva Sweden AB, Uppsala (SE)

( * ) Notice: Subject to any disclaimer, the term of this patent is extended or adjusted under 35 U.S.C. 154(b) by 893 days.

(21) Appl. No.: 17/611,025

(22) PCT Filed: May 26, 2020

(86) PCT No.: PCT/EP2020/064608
§ 371 (c)(1),
(2) Date: Nov. 12, 2021

(87) PCT Pub. No.: WO2020/239786
PCT Pub. Date: Dec. 3, 2020

(65) Prior Publication Data
US 2022/0243159 A1  Aug. 4, 2022

(30) Foreign Application Priority Data
May 29, 2019  (IN) .............................. 201911021316

(51) Int. Cl.
*C12M 3/00*   (2006.01)
*C12M 1/00*   (2006.01)
(Continued)

(52) U.S. Cl.
CPC ............ *C12M 23/48* (2013.01); *C12M 23/14* (2013.01); *C12M 27/02* (2013.01); *C12M 41/48* (2013.01)

(58) Field of Classification Search
None
See application file for complete search history.

(56) References Cited

U.S. PATENT DOCUMENTS

2009/0290962 A1* 11/2009 Fisher .................... C12M 23/14
                                                                414/816
2011/0249526 A1    10/2011 Wong et al.
(Continued)

FOREIGN PATENT DOCUMENTS

CN    102892487 A    1/2013
CN    105531004 A    4/2016
(Continued)

OTHER PUBLICATIONS

Halder, Inc. "Index Plungers / Index Bolts". Date accessed: Dec. 9, 2024. Website date: Dec. 15, 2015. <https://www.halder.com/PM/Standard-Parts/Machine-and-Fixture-Elements/Index-Plungers-Index-Bolts> (Year: 2015).*

(Continued)

*Primary Examiner* — Michael A Marcheschi
*Assistant Examiner* — Nathan G Esperon
(74) *Attorney, Agent, or Firm* — Eversheds-Sutherland (US) LLP (57) ABSTRACT

Systems (100, 700) and method for probe angle adjustment in bioreactor vessels are provided. The system (100) comprises a reactor vessel (110) having a reaction chamber (113), wherein the reaction chamber (113) has at least one opening (111). A probe support bar assembly (200, 300) is mounted on the reactor vessel (110) and a sensing probe (114) is mounted on the probe support bar (112) and the (Continued)

sensing probe (114) passes through the opening (111) on the reaction chamber (113). Movement of the probe support bar assembly (200, 300) changes the angle of inclination of sensing probe (114) inside the reaction chamber (113).

10 Claims, 10 Drawing Sheets

(51) Int. Cl.
*C12M 1/06* (2006.01)
*C12M 1/36* (2006.01)

(56) References Cited

U.S. PATENT DOCUMENTS

| | | | |
|---|---|---|---|
| 2013/0101982 A1* | 4/2013 | Goodwin | B01F 27/213 |
| | | | 435/325 |
| 2017/0349874 A1 | 12/2017 | Jaques et al. | |
| 2019/0031996 A1* | 1/2019 | Topp-Manske | C12M 23/46 |

FOREIGN PATENT DOCUMENTS

| | | | |
|---|---|---|---|
| CN | 205223225 U | 5/2016 | |
| CN | 106795467 A | 5/2017 | |
| CN | 206818749 U | 12/2017 | |
| CN | 109477052 A | 3/2019 | |
| CN | 208701777 U | 4/2019 | |
| WO | 2011112680 A1 | 9/2011 | |
| WO | WO-2019077623 A1 * | 4/2019 | ............ C12M 1/00 |

OTHER PUBLICATIONS

Home Depot. "Pins, Rings & Clips". Date accessed: Dec. 10, 2024. Website date: Mar. 7, 2017. <https://web.archive.org/web/20170307075705/http://www.homedepot.com/b/Hardware-Fasteners-Pins-Rings-Clips/N-5yc1vZc2d3> (Year: 2017).*
PCT International Search Report and Written Opinion of PCT/EP2020/064608, dated Sep. 11, 2020 (11 pages).
Chinese Office Action for CN Application No. 202080039251.4 mailed Oct. 28, 2023 (17 pages, with English translation).
Glindkamp et al., "Sensors in Disposable Bioreactors Status and Trends", Adv Biochem Engin/Biotechnology, 2009: 1-25.
Shi et al., "The Design of an ATR Probe for Online Monitoring", Spectroscopy and Spectral Analysis, 2016, 36(6): 324-328.

* cited by examiner

SYSTEMS AND METHODS FOR PROBE ANGLE ADJUSTMENT IN BIOREACTORS

CROSS REFERENCE TO RELATED APPLICATIONS

This application is a U.S. National Phase Application of WO Application No. PCT/EP2020/064608, filed May 26, 2020, which claims priority benefit to Indian Application No. 201911021316, filed May 29, 2019, the entire contents of which are incorporated by reference herein.

FIELD OF THE INVENTION

Embodiments of the present specification relate generally to adjusting the angle of the probe support assembly in bioreactors and more specifically to systems and methods for an angle adjustable probe support assembly for inserting sensing probes at an angle inside the bioreactors.

BACKGROUND OF THE INVENTION

Bioreactors are widely used for biomanufacturing of biotechnology products. Multi-use bioreactors generally require a large capital investment for purchase and installation, validated processes for cleaning, and sterilization and a skilled staff for operation and maintenance. For this reason, in smaller-volume operations, disposable bioreactors or disposable bags are being used increasingly. Single use or disposable bags are usually made of three-layer plastic and they are pre-sterilized before mounting within the bioreactor.

Several parameters of the process fluid within the disposable bags are measured using sensing probes. Some examples of these parameters include pH, temperature of the cell culture, glucose, oxygen levels, conductivity, colour change etc. Sensing probes are passed through the bag at predetermined locations on the bag surface and create direct contact with the cell culture. Sensing probes measure various parameters of the process fluid and provide signals representative of the working parameters of the process fluid. For the existing sensing probes, the probe mounting locations are decided by the face ports present on the surface of the disposable bag that are sealed to the disposable bag.

An impeller is located at the bottom of the bioreactor and provides homogeneous mixing across the vessel of the process fluid ingredients like cells, gases and nutrients. Movement of impeller ensures uniform mixing of the process fluid to promote growth of the culture without settling the culture at the bottom of the bioreactor. Therefore, while mounting the sensing probes within the bioreactor, it becomes necessary to have minimum working volume of the disposable bag to maintain safe distance between the sensing probe and the impeller. Accordingly, the present XDR-10 instrument bag has 4.5 Liter minimum working volume of the bag and none of the stirred tank instrument bags offer minimum working volume below 4.5 Liter. Also, due to manufacturing limitations and risk of sensing probe collision to the impeller, it becomes extremely challenging to move the sensing probe location down in order to reach the 2.0 Liter working volume of the bag.

Moreover, the bubbles generated in the process fluid are deposited on the surface of the sensing probe located within the disposable bag. This adversely affects the sensing accuracy of the sensing probes. This problem occurs due to fixed location of sensing probes and it is known as "bubble entrapment". Bubble entrapment leads to wrong and untimely results where the operator of the bioreactor is unable to maintain the uniform process parameters across the batch of bioreactors and resulting in inconsistent yield within the batches.

Recent bioreactors have a fixed sensing probe support bar on which one end of the sensing probe is mounted without any provision for adjustment of the sensing probe angle. Sensing probes mounted on the fixed support bar have movement restriction in vertical direction. Any change or adjustment in location of sensing probe requires pre-adjusting the support bar structure across all the bioreactor batches and remounting the sensing probe over the support bar. Also, this fixed arrangement of the sensing probe leads to bubble entrapment, operator unable to maintain the probe angle resulting in the yield variation across the batches. Therefore, current approaches to mounting the sensing probes within the disposable bag suffer from many disadvantages.

BRIEF DESCRIPTION OF THE INVENTION

In accordance with one aspect of the invention a system is disclosed. The system comprises a reactor vessel including a reaction chamber and the reaction chamber has at least one opening. Further, a probe support bar assembly is mounted on the reactor vessel with at least one sensing probe mounted on the probe support bar that passes through the opening on the reaction chamber. Movement of the probe support bar assembly changes the angle of inclination of at least one sensing probe inside the reaction chamber.

In accordance with one aspect of the invention a method is disclosed. The method of adjusting an angle of the sensing probe comprises mounting the sensing probes on the probe support bar. Furthermore, the method includes releasing the probe support bar from a locked position to a movable position. Moreover, the method includes moving the probe support bar thereby adjusting the sensing probes at a different angle and locking the probe support bar having sensing probes mounted thereon at the different angle.

The above advantages and other advantages and feature of the present description will be readily apparent from the following detailed description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this specification.

BRIEF DESCRIPTION OF THE DRAWINGS

Various features of embodiments of the present specification will be better understood when the following non-limiting embodiments in the detailed description are read with reference to the accompanying drawings, wherein below.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "another embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Disclosed herein are systems and method for moving angle adjustable probe support assemblies and adjusting the inclination of sensing probes for bioreactors. In other embodiments, an angular face port is provided for probe sheath assembly, where barb and shaft are at an angle with respect to face port sealing surface of the disposable bag.

Bioreactors are specially manufactured systems or vessels used in biotechnology industry for carrying out various processes that use variety of chemicals, organisms, nutrients and substances derived therefrom that together constitute "process fluid". Bioreactors are typically used to grow cell cultures using aerobic or anerobic processes in generally cylindrical bioreactor vessels. A typical bioreactor consists of an impeller or an agitator for mixing and homogenization of the contents within the reactor, baffles for breaking the vortex formed within the content, a sparger for supplying adequate oxygen for cell growth, a protective stainless still enclosure that covers up the content. Several bioreactor vessels may be employed for batch production of process fluid and it is an important yet difficult task for the operator to maintain uniformity of process parameters across all the vessels of the batch. Bioreactor enclosures are provided with openings in the form of mounting brackets on the surface for mounting the sensing probes within the reactor contents.

Disposable bioreactors or single use bioreactors are bioreactors containing disposable bags instead of culture vessels. Disposable bags act as a reaction chamber for bioreactors. It is understood that the reaction chamber may be in the form of disposable bags or use of any other suitable enclosure is envisaged. Disposable bags are typically pre-sterilized three-layered bags that are assembled within the bioreactor vessel for carrying out the processes. Different invasive and non-invasive techniques are available for measuring the process parameters of the contents within the disposable bag. Disposable bags are provided with openings for mounting the sensing probes within the volume of the bag. A sealing is provided at the interface of the sensing probe and the disposable bag to prevent the contact of the reaction fluid within the disposable bag with the outside environment. Operator of the bioreactor vessel continuously monitors various parameters of the reaction fluid to maintain uniformity of parameters across several vessels of the batch process. Although the present application describes probe support assembly and its application to bioreactors, it is readily apparent from the description of embodiments that the probe support assembly may be used along with any other kind of reactors.

Figure 1:
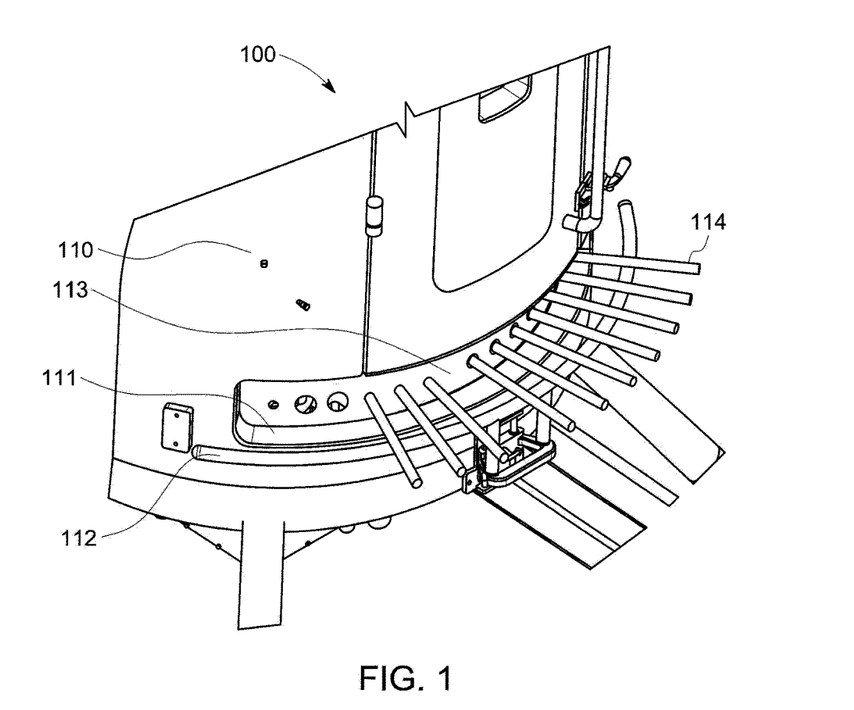
FIG. 1 is a system illustrating a bioreactor vessel comprising a disposable bag, and sensing probes mounted over the probe support bar in accordance with aspects of the present specification.

Referring to FIG. 1, a schematic representation of a probe angle adjustment system (100) is shown in accordance with the aspects of the specification. The probe angle adjustment system (100) includes a bioreactor vessel (110) and a probe support bar (112) mounted close to the bioreactor vessel (100) for inserting sensing probes (114) inside the bioreactor vessel (110). The bioreactor vessel (110) is provided with an opening in the form of a mounting bracket (111). The probe support bar (112) is placed in front of the mounting bracket (111). A disposable bag (113) having several openings for inserting sensing probes (114) is mounted within the volume of the bioreactor vessel (110) enclosure; and several sensing probes (114) are mounted on the probe support bar (112). Leading end or the sensing end (not shown) of the sensing probes (114) passes through the openings on the surface of the disposable bag (113) and inside the volume of disposable bag (113) and tailing end of the sensing probes (114) rests on the surface of the probe support bar (112). Sensing probes (114) are employed to measure various process parameters, for example, oxygen content of the reaction fluid, temperature, nutrients, pH etc. Leading end of the sensing probes (114) has sensing element that produces appropriate signals corresponding to the level of the parameter in the reaction fluid. The sensing probes (114) described herein are by way of example only and use of any other sensing probes widely known in the art is envisaged. Examples and features of specific sensing probes (114) mentioned herein are not meant to limit the type of sensing probes (114).

Figure 2:
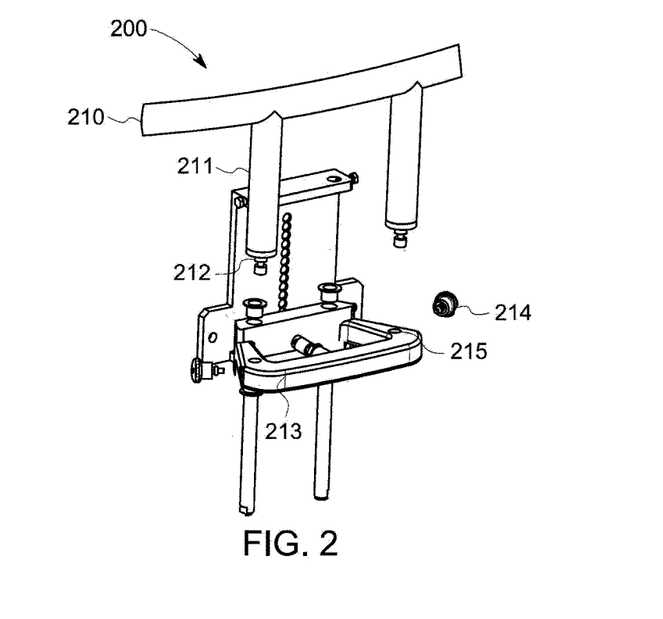
FIG. 2 is a detailed view of the probe support bar assembly of FIG. 1, in accordance with aspects of the present specification.

FIG. 2 illustrates details of a probe support bar assembly (200) of FIG. 1 in accordance with the aspects of the specification. A probe support bar (210) having semi-circular shape corresponding to the shape of the bioreactor (not shown), however, different shapes of the probe support bar (210) are within the scope of the description. The probe bar leg (211) comprises grooves (212) that are used for mounting the probe support bar (210) removably onto a linear bush holder (213). The probe bar leg (211) is locked inside the linear bush holder (213) using the mini-index plunger or pin (214). Probe bar leg (211) is positioned into the holes (215)

in linear bush holder (213) and two mini-index plungers or pins (214) lock the probe bar leg (211) to the linear bush holder (213). The linear bush holder (213) also acts as a handle for operating the probe support bar assembly (200). To remove probe bar leg (211) from the handle (213), mini-index plungers or pins (214) are unlocked by pulling the knob out and turning by approximately 30° and secured by a notched catch. Removal of probe support bar (210) and its leg(s) (211) is convenient to clear the space for disposable bag loading. The probe support bar (210) is typically made of stainless steel, however, without limitation to the kind of material used for making the probe support bar (210), use of any other kind of material for probe support bar (210) is within the scope of the present application.

Figure 3:
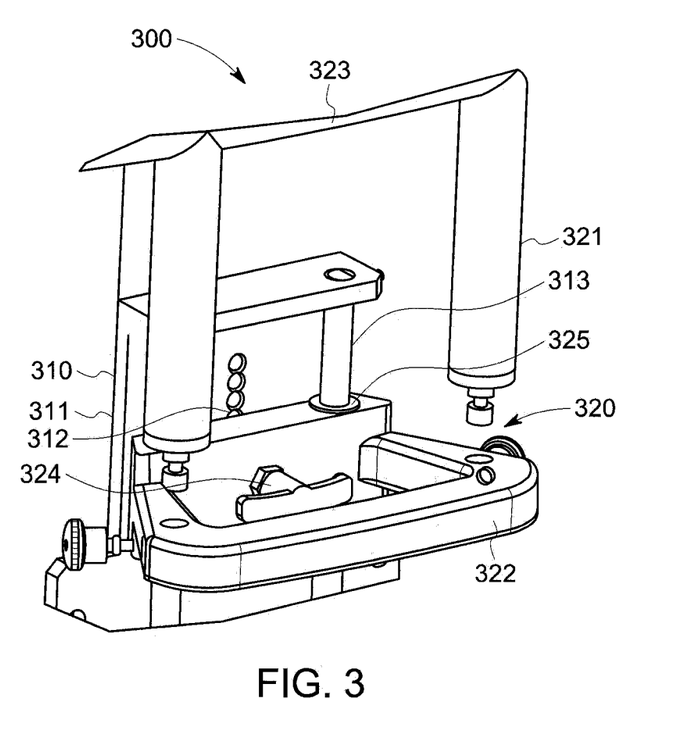
FIG. 3 is a detailed view of the probe support bar assembly of FIG. 1, in accordance with other aspects of the present specification.

As schematically shown in FIG. 3, an angle adjustable probe support bar assembly (200) of FIG. 2 is illustrated, in accordance with the aspects of the specification. The angle adjustable probe support bar assembly (300) is divided to two sub-assemblies, fixed assembly (310) and moving assembly (320 needs a ref in FIG. 3). Fixed assembly (310) is mounted to front of the bioreactor vessel. This fixed assembly (310) comprises linear shaft holder (311) having several grooves (312) for inserting the index plunger (324) and linear rod (313) for connecting the fixed assembly (310) to the moving assembly (320) to provide indexable height adjustment of the probe support bar (shown partially as ref 323 in FIG. 3) relative to the fixed linear shaft holder (311). Moving assembly (320) comprises probe bar leg (321), linear bush holder (322) as shown in FIG. 1 and additionally comprises index plunger (324). The linear bush holder (322) also acts as a handle for holding the moving assembly (320) and the index plunger (324) is a pin that passes through the surface of the moving assembly (320) and any of the several grooves (312) on the linear shaft holder (311).

In angle adjustable probe support bar assembly (300) of FIG. 3, the up and down movement of probe bar leg (321) provides required angle adjustment to all the sensing probes mounted over the probe support bar (323). The probe support bar (323) supports tailing end of sensing probes and leading end of the sensing probes is inserted inside the disposable bag and desired probe angle is achieved by moving the probe support bar (323) up or down.

The probe support bar (323) is mounted to linear bush holder (322) which consists of four flange linear bushes (325) only one of which is shown in FIG. 3. These linear bushes slide on two linear shafts (313) mounted to linear shaft holder (311). When the index plunger (324) is locked into the linear bush holder (311), up or down movement of the probe support bar (323) is prevented due to locking. To adjust the probe angle, the index plunger (324) is released to unlock position and moved up for locking into any of the subsequent grooves (312). This pushes the probe support bar (323) upward resulting in change in angle of inclination of the sensing probes. Ergonomically designed handle (322) ensures ease for the operator to unlock the index plunger (324) and move the sensing probes in required direction.

Figure 4:
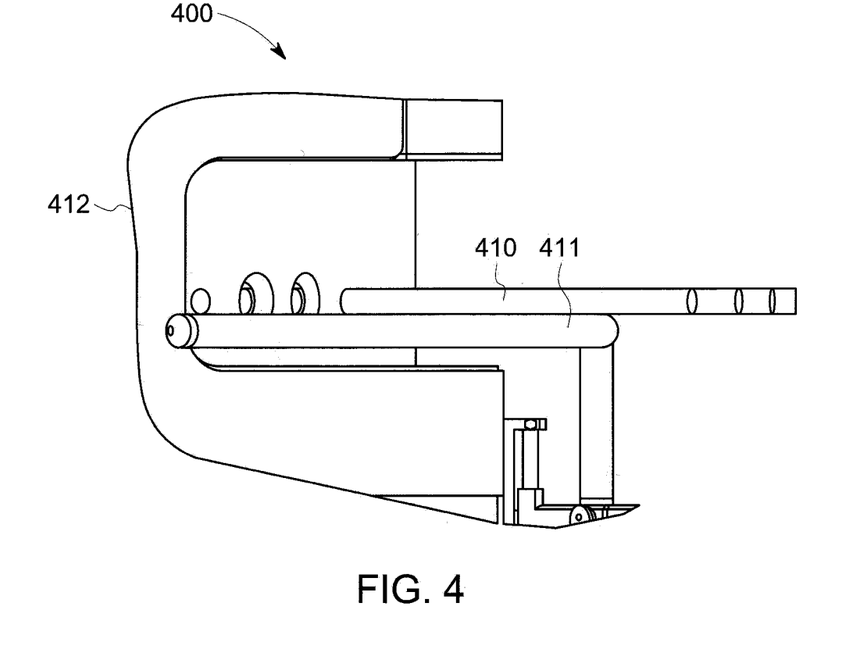
FIG. 4 is a system illustrating sensing probes mounted on the probe support bar at 0-degree position, in accordance with aspects of the present specification.

FIG. 4 illustrates probe support bar assembly (400) at zero-degree position of the sensing probes (410), in accordance with the aspects of the specification. The sensing probes (410) are mounted on the probe support bar (411) at zero-degree position. The leading ends of the sensing probes (410) are positioned within the disposable bag (not shown) to sense various reaction parameters of the process fluid and trailing ends of the sensing probes (410) are mounted on the probe support bar (411). Reaction parameters related to various reactants within different bioreactors vessels (412) should remain similar without drastic variations within different reaction vessels (412) of the same batch. When variation in reaction parameters across different bioreactor vessels (412) of the same batch is observed, the operator is required adjust those parameters by adjusting the quantities and processing time of different reactants within the batch of bioreactor vessels (412) to achieve uniformity and homogeneity of the output reaction fluid. When the sensing probes (410) are positioned on fixed support bar at zero-degree as shown in FIG. 4, problem of bubble entrapment over the sensing probes (410) is observed that leads to wrong result output from the sensing probes (410). Accordingly, it is not possible for the operator to maintain uniform process parameters across the batch based on the sensing probe (410) output.

Figure 5:
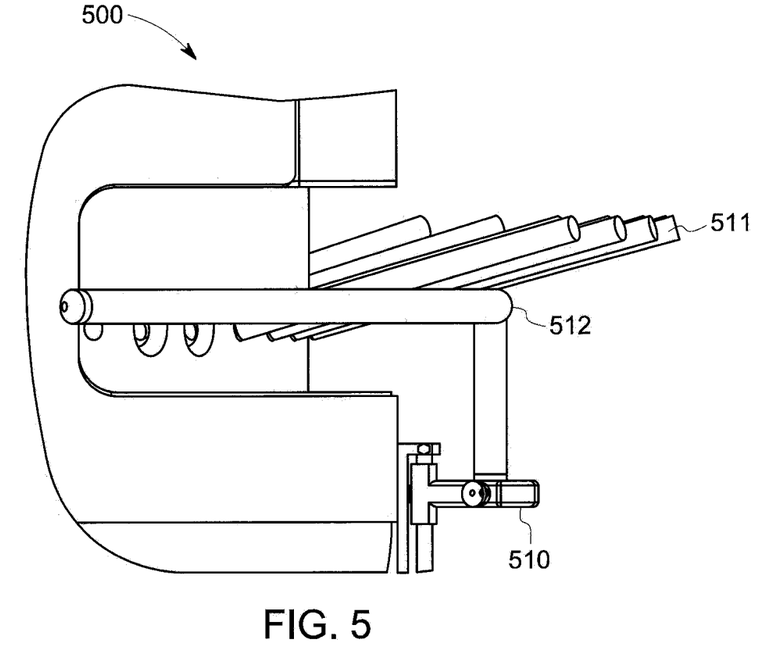
FIG. 5 is a system illustrating sensing probes moved to approximately 15-degrees position, in accordance with aspects of the present specification.

FIG. 5 illustrates probe support bar assembly (500) at 15-degree position of the sensing probes (511), in accordance with the aspects of the specification. The handle (510) is moved up by unlocking the index plunger and moving the handle (510) upwards to lock the handle (510) in subsequent grooves in the linear shaft holder. The index plunger is moved in any of the next grooves to lift the probe support bar (512) for adjusting the angle of sensing probes (511). The probe support bar (512) is moved up to change the sensing probe (511) angle up to approximately 15 degrees. This provides the necessary flexibility to the operator for adjusting all the sensing probes (511) across the batch at uniform angle across the batch.

Figure 6:
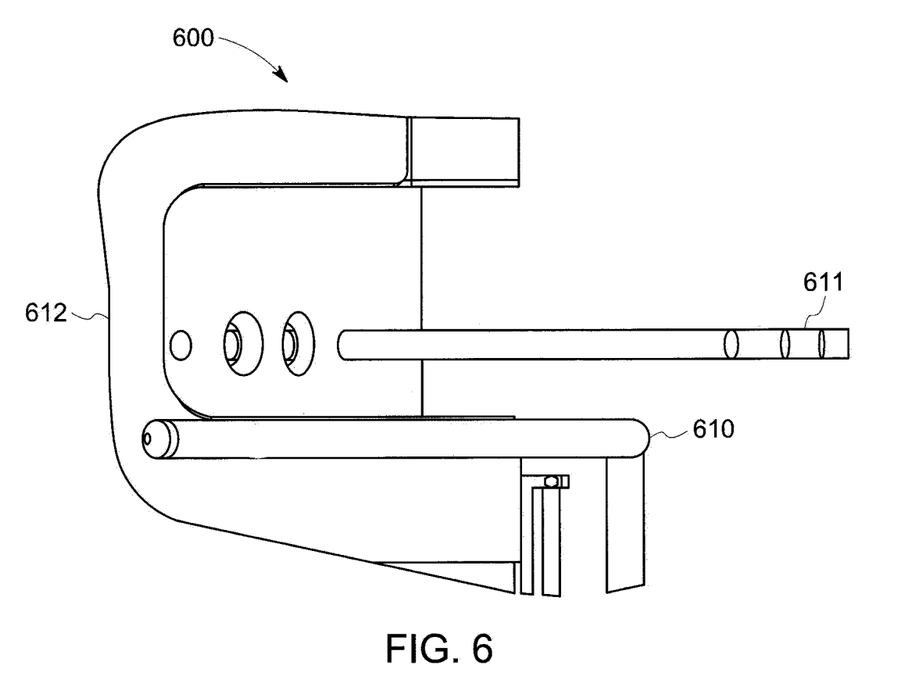
FIG. 6 is a system illustrating probe support bar cleared from the sensing probes for mounting the disposable bag, in accordance with aspects of the present specification.

FIG. 6, illustrates probe support bar assembly (600) where sensing probes (611) are disconnected from the probe support bar (610), in accordance with the aspects of the specification. The index plunger is released to clear the contact between the probe support bar (610) and the sensing probes (611) for mounting the disposable bag. Once the disposable bag is mounted within the bioreactor vessel (612), index plunger is moved to create contact between the probe support bar (610) and sensing probes (611).

Figure 7A:
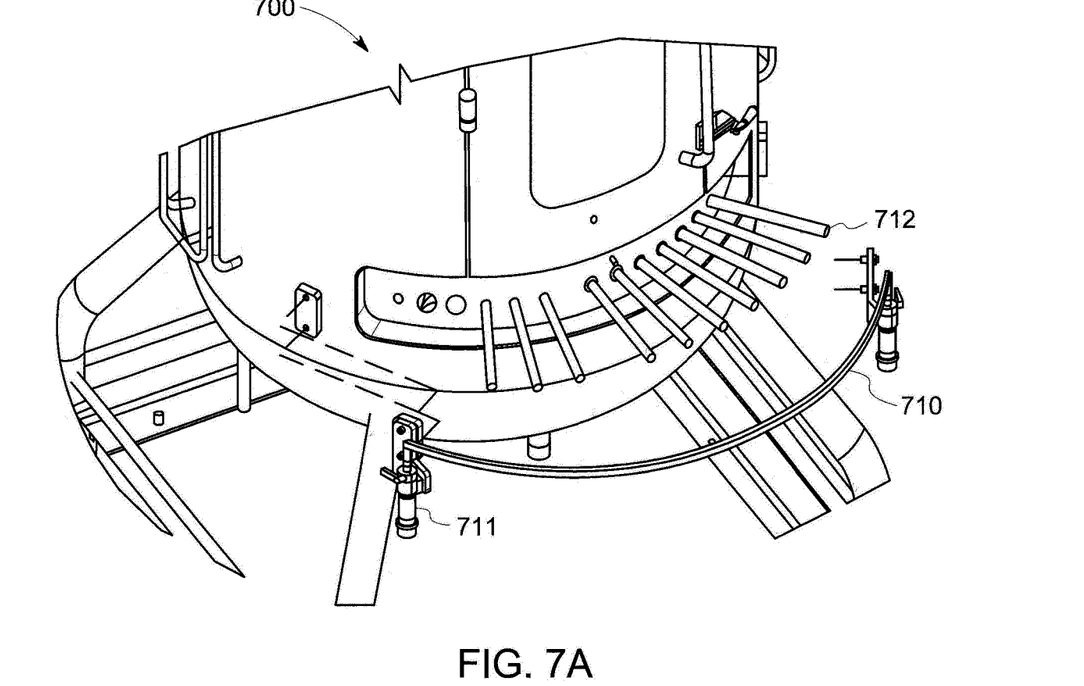
FIG. 7(a) is a system illustrating spring and latch lever arrangement for mounting probe support bar assembly, in accordance with aspects of the present specification.
Figure 7B:
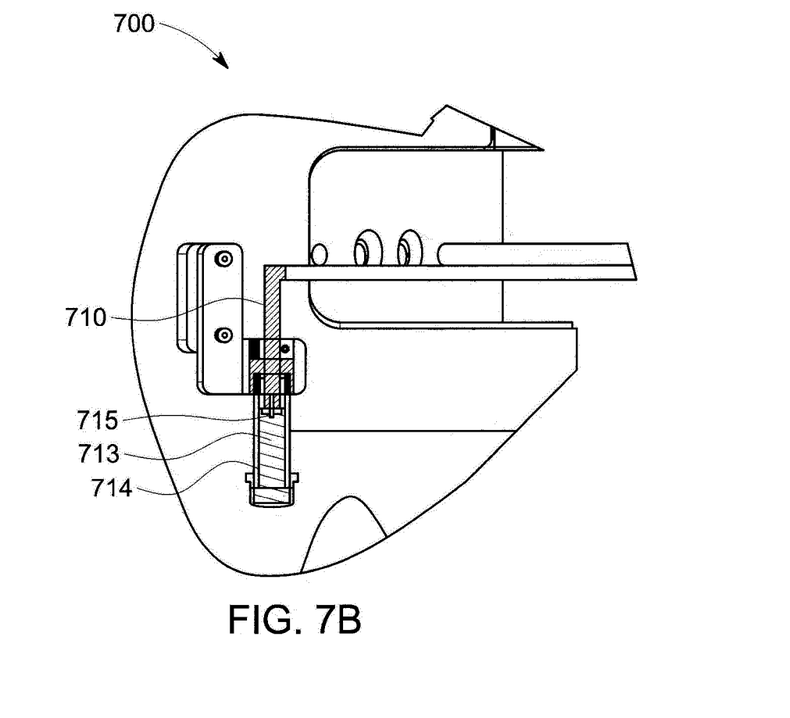
FIG. 7(b)-(7c) are detailed views of the spring and latch lever arrangement of FIG. 7(a), in accordance with aspects of the present specification.
Figure 7C:
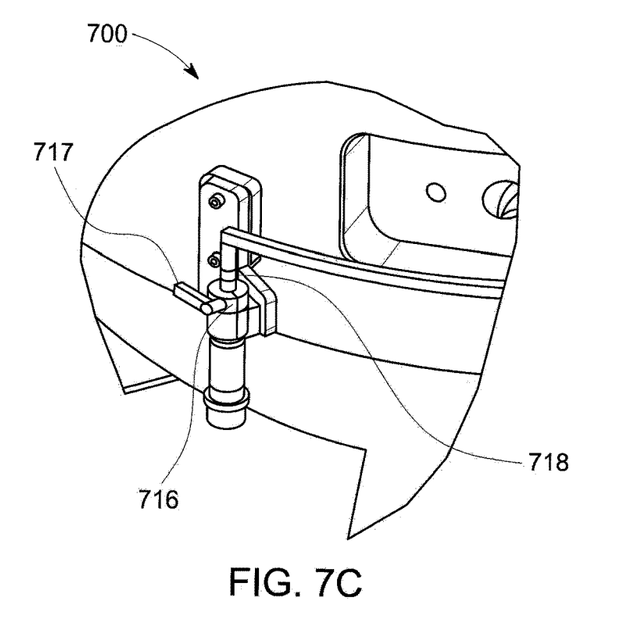

In another embodiment as shown in FIGS. 7(a)-7(c), a probe support bar assembly (700) is illustrated, in accordance with the aspects of the specification. The probe support bar (710) is mounted on a stopper plate (715) positioned over a spring (713). FIG. 7(a) shows probe support bar (710) disconnected from sensing probes (712) for mounting the disposable bag. As shown in FIGS. 7(b)-7(c), the probe support assembly comprises a spring (713) mounted within a spring holder (714) and positioned below a stopper plate (715). The stopper plate (715) engages with the probe bar leg (710) using hex soc head screw, and a collar (716) with a latch lever (717) is positioned around the stopper plate (715) to enclose the probe bar leg (710). The probe bar leg (710) is provided with circular grooves (718) on its surface and the latch lever (717) is engaged within the grooves (718) to hold the probe bar leg (710) in one of the down or up position. To further adjust the position of the probe support bar (710) up or down, the latch lever (717) is disengaged from its existing groove (718) to release the probe support bar (710) from locked position and the latch lever (717) is moved up or down into next groove (718) on the surface of the probe support leg (710). This up or down movement of latch lever (717) results in corresponding up or down movement of the probe support bar (710). The spring (713) provides additional lifting force when the probe support bar (710) is moving upward which reduces the operator effort to lift the probe support bar (710) and during the collar (716) unlock condition, spring (713) will provide dampening effect when the operator takes off his hand from the probe support bar (710).

In another embodiment, an exemplary method of assembling the angle adjustable probe support assembly on the bioreactor vessel is disclosed, in accordance with the aspects of the specification. The method comprises mounting a disposable bag having openings inside the bioreactor vessel; mounting the linear shaft holder onto the bioreactor vessel; mounting the probe bar leg onto the linear bush holder and fixing the probe bar leg onto the linear bush holder using an index plunger; fixing the linear bush holder on to the linear rod such that the index plunger is locked within one of the grooves on the linear shaft holder; mounting tailing end of at least one sensing probe on the probe support bar and inserting the leading end of the sensing probe inside the openings on the disposable bag. It is understood that the exemplary method is for illustration purpose and it is not limited by any particular order of the steps.

In another embodiment, an exemplary method of assembling the angle adjustable probe support assembly on the bioreactor vessel is disclosed, in accordance with the aspects of the specification. The method comprises mounting a disposable bag having openings inside the bioreactor vessel; mounting the probe bar leg having grooves on its surface onto spring supported stopper plate and engaging the latch lever into the grooves on the probe bar leg; and mounting tailing end of at least one sensing probe on the probe support bar and inserting the leading end of the sensing probe inside the openings on the disposable bag.

In yet another embodiment, a method of adjusting the angle of the probe support bar is provided. The method comprises releasing the index plunger from the grooves within the linear shaft holder; moving the index plunger up or down using linear bush holder and reinserting the index plunger within the grooves of the linear shaft holder to raise or lower the position of the probe support bar resulting in corresponding raising or lowering of the sensing probes mounted on the probe support bar. In one exemplary embodiment, every 13.5 mm movement in the probe support bar is equivalent to 5-degree change in probe position. The leading end of the probes is fixed in the bag and tailing end will be moving along with probe bar in the vertical direction. Visible numeric marking is provided in the probe support bar that will help to operator to position the probe support bar and adjust the angle of the probe.

In yet another embodiment, a method of adjusting the angle of the probe support bar is provided. The method comprises releasing the latch lever from the grooves on the surface of the probe bar leg; moving the latch lever up or down using the spring force and reinserting the latch lever within the grooves on the surface of the probe bar leg to raise or lower the probe support bar resulting in corresponding raising or lowering of the sensing probes mounted on the probe support bar.

Figure 8:
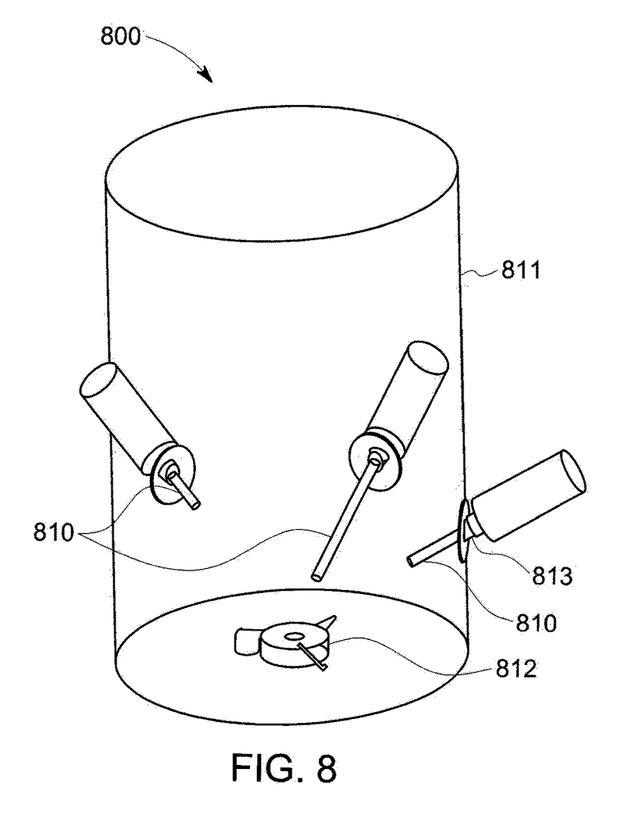
FIG. 8 is an inclined port arrangement for inserting sensing probes inside the disposable bag.

In one embodiment as shown in FIG. 8, an arrangement (800) is provided to attain the sensing probes (810) contact to the reaction fluid at minimum height of the disposable bag (811) to achieve low working volume, in accordance with the aspects of the specification. An impeller or agitator (812) is typically mounted within the working volume of the disposable bag (811) at the bottom of the disposable bag (811). The impeller or agitator (812) has blades to stir the reaction fluid and achieve homogeneity during processing. Accordingly, it is not desirable to place the sensing probes (810) closer to the impeller (812), as any contact between the impeller (812) in motion and the sensing probe (810) might damage both the impeller (812) and the sensing probe (810). An inclined face port (813) is provided on the surface of the disposable bag (811) that provide flexibility of inserting the sensing probes (810) at an angle.

The problem associated with the present XDR-10 instruments having 4.5 liter minimum working volume may be addressed by the inclined face port (813) arrangement of FIG. 8. With the inclined face port (813), the sensing probes (810) may be inserted deeper into the reaction fluid and closer to the impeller (812) without contacting the impeller (812). This arrangement of sensing probes (810) going deep inside the reaction fluid facilitates using lower amount of reaction fluids than the presently available reaction vessels. This embodiment gives flexibility to users to insert sensing probes (810) in an angle and hence it is possible to reach probe tip to the lesser liquid height inside the Single-Use bags for low working volume. Lower working volumes of as low as two liters are now possible with the present embodiment.

Inclined face ports (813) may have various angles on the surface of the disposable bag. Also, inclined surface ports (813) can be placed vertically to accommodate more ports. Typical angles for the inclined surface port (813) are 45° shaft face port and 60° shaft face port. The outer diameter of the inclined face port (813) flat surface increases with the increase in the shaft angle and 60° port angle is more beneficial because of smaller footprint and a greater number of inclined face ports (813) can be accommodated in the same horizontal plane. It may be noted that change in angle of the inclined face port (813) requires corresponding change in bag design for sealing the inclined face port (813) to the surface of the disposable bag.

A combination of sensing probe support bar (112) with the inclined face port (813) on the surface of the disposable bag provides for more than one instances for changing the sensing probe (810) angle within the reaction fluid. Accordingly, the operator will be able to more effectively obtain the reaction fluid parameters and control the bioreactor vessels (110) individually to achieve uniformity and homogeneity among different bioreactor vessels (110) of the batch.

Figure 9:
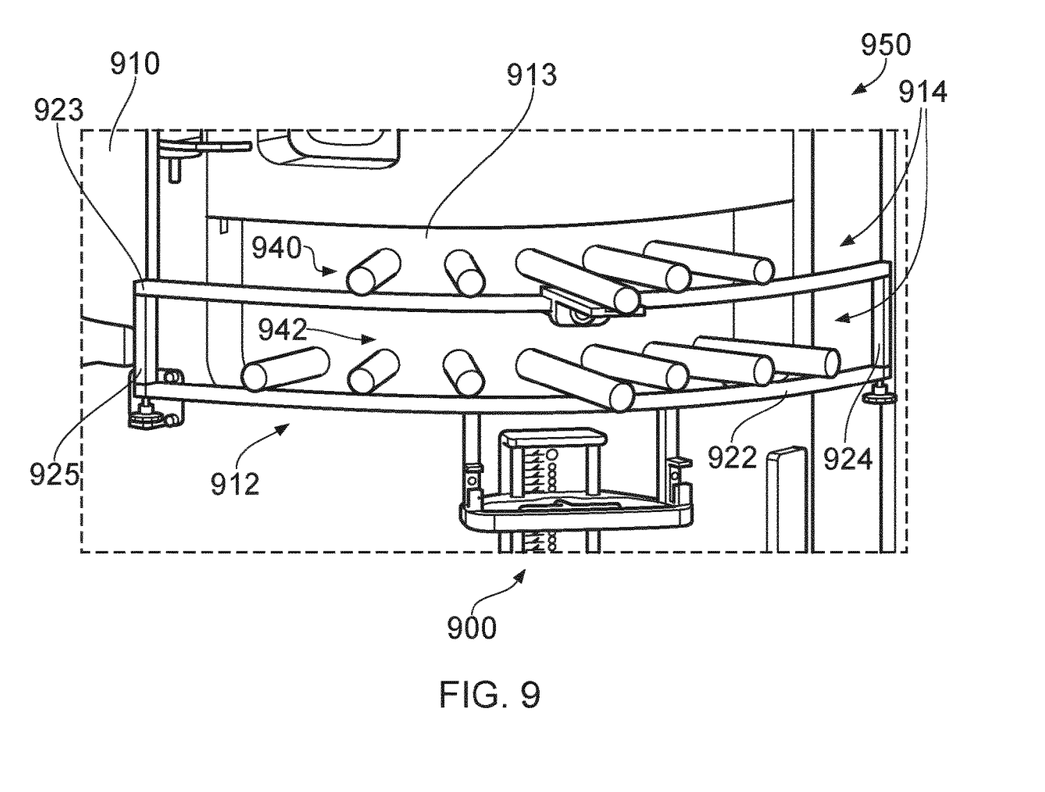
FIG. 9 shows an embodiment of the present invention that provides a system illustrating a bioreactor vessel comprising a disposable bag and two rows of sensing probes.

FIG. 9 shows an embodiment of the present invention that provides a system (950) comprising a bioreactor vessel (910) for housing a disposable bag (913) that is provided with two rows (940, 942) of sensing probes (914). The sensing probes may be inserted into the disposable bag (913) through various ports, e.g. of the type as described above in connection with FIG. 8. The bioreactor vessel (910) may further be configured to process a specific predetermined volume of fluid, for example 200 litres, in the bioreactor vessel (910). Moreover, by providing a plurality of rows of sensing probes, optimal measurements can be made in bioreactor vessels having a variety of differing sized openings provided in the reaction chambers thereof.

In the embodiment of FIG. 9, the bioreactor vessel (910) is configured to accommodate the two rows (940, 942) of sensing probes (914) which can pivot therein as a probe support bar assembly (900) is actuated. The probe support bar assembly (900) may incorporate various mechanisms and components, for example including those that are described above in connection with FIGS. 1 to 7. Other probe support bar assembly arrangements may also be provided. In various embodiments, a total number of twelve sensing probes (914) is provided, with six probes (914) being provided in a lower row (942) and a further six probes (914) being provided in an upper row (940) in the embodiment of FIG. 9.

The probe support bar assembly (900) is provided with a support frame (912) connected to an actuation mechanism. The support frame (912) includes two substantially parallel horizontally-oriented probe support bars (922, 923) spaced apart by a pair of substantially vertically-orientated end pieces (924, 925). The lower support bar (922) is configured to move the probes (914) of the lower row (942), and the upper support bar (923) is configured to move the probes (914) of the upper row (940). In certain embodiments one or more of the probes (914) may be connected to respective of the support bars (922, 923). In various embodiments, one or more of the probes (914) may only be supported by a respective support bar (922, 923) at a proximal end thereof, such that a lowering of the support bar assembly (900) allows a distal end of such a probe(s) (914) within the bioreactor vessel (910) to move upwardly under the influence of gravity.

Actuation of the probe support bar assembly (900) can thus be used to change the relative position/angle of the probes (914) within a disposable bag (913). This has the advantage that low volumes of content within the bioreactor vessel (910) can be analysed if necessary. It has the further advantage that by controlling the angle of the probes, the number of bubbles that get stuck to the distal tips of probes (914), and that which may otherwise affect the readings taken by the probes (914), can be reduced or substantially eliminated.

Figure 10A:
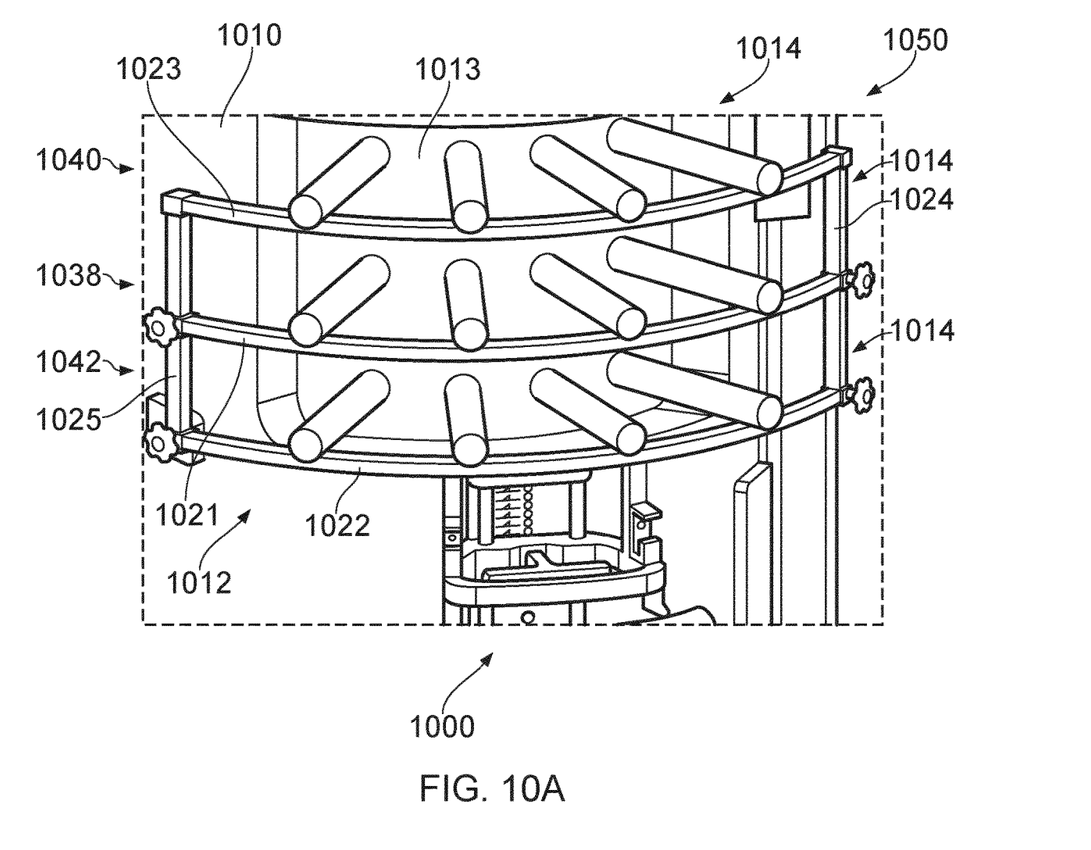
FIGS. 10A-10E show an embodiment of the present invention that provides a system illustrating a bioreactor vessel comprising a disposable bag and three rows of sensing probes.

FIG. 10A shows an embodiment of the present invention that provides a system (1050) comprising a bioreactor vessel (1010) for housing a disposable bag (1013) that is provided with three rows (1038, 1040, 1042) of sensing probes (1014). The sensing probes may be inserted into the disposable bag (1013) through various ports, e.g. of the type as described above in connection with FIG. 8. The bioreactor vessel (1010) may further be configured to process a specific predetermined volume of fluid, for example 50 litres, in the bioreactor vessel (1010).

In the embodiment of FIG. 10A, the bioreactor vessel (1010) is configured to accommodate the three rows (1038, 1040, 1042) of sensing probes (1014) which can pivot therein as a probe support bar assembly (1000) is actuated. The probe support bar assembly (1000) may incorporate various mechanisms and components, for example including those that are described above in connection with FIGS. 1 to 7. Other probe support bar assembly arrangements may also be provided. In this embodiment, a total number of twelve sensing probes (1014) is provided, with four probes (1014) being provided in a lower row (1042), four probes (1014) being provided in a central row (1038) and a further four probes (1014) being provided in an upper row (1040).

The probe support bar assembly (1000) is provided with a support frame (1012) connected to an actuation mechanism. The support frame (1012) includes three substantially parallel horizontally-oriented probe support bars (1021, 1022, 1023) spaced apart by a pair of substantially vertically-orientated end pieces (1024, 1025). The lower support bar (1022) is configured to move the probes (1014) of the lower row (1042), the central support bar (1021) is configured to move the probes (1014) of the central row (1038) and the upper support bar (1023) is configured to move the probes (1014) of the upper row (1040).

In certain embodiments one or more of the probes (1014) may be connected to respective of the support bars (1021, 1022, 1023). In various embodiments, one or more of the probes (1014) may only be supported by a respective support bar (1021, 1022, 1023) at a proximal end thereof, such that a lowering of the support bar assembly (1000) allows a distal end of the probe(s) (1014) within the bioreactor vessel (1010) to move upwardly under the influence of gravity.

Actuation of the probe support bar assembly (1000) can thus be used to change the relative position/angle of the probes (1014) within a disposable bag (1013). This may thus provide various advantages as are described herein.

Figure 10B:
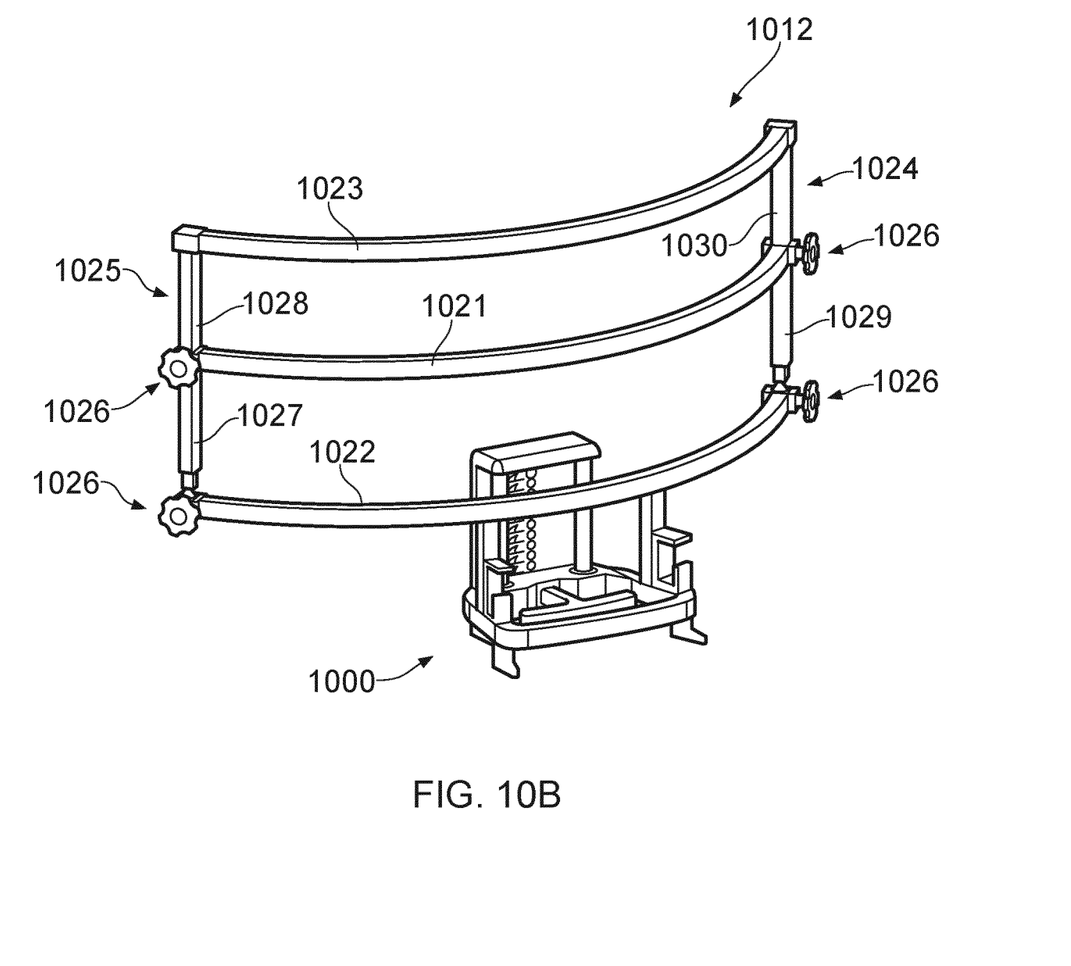

FIG. 10B shows the probe support bar assembly (1000) and the support frame (1012) separated from the system (1050), for further clarity. More specifically, FIG. 10B illustrates that the end pieces (1024, 1025) are formed from respective support sections (1027, 1028, 1029, 1030) that can be coupled together using a plurality of respective releasable couplings (1026). It will also be apparent to those skilled in the art, that such a modular design can be used to enable the addition of as many additional probe support bars as are required for any particular application.

Figure 10C:
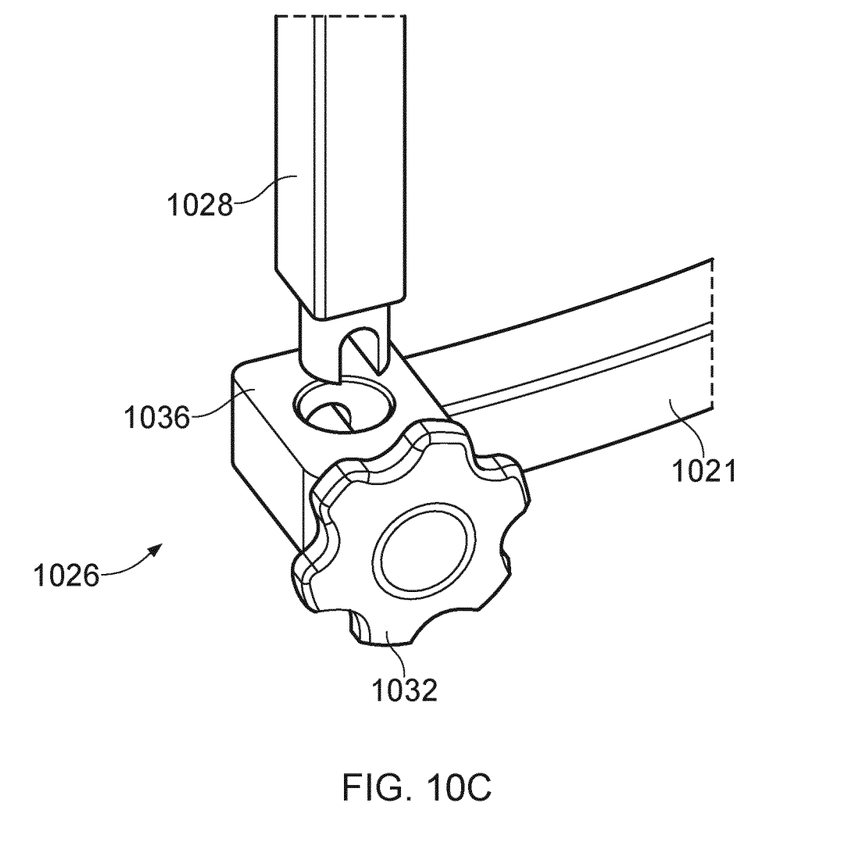

FIG. 10C shows a releasable coupling (1026) of the general type that may be used in the support frame (1012) of FIG. 10B. The releasable coupling (1026) comprises a threaded knob (1032) at least partially housed in a connector piece (1036). The connector piece (1036) includes respective recesses for housing a C-shaped end portion of the support section (1028) and the probe support bar (1021). The probe support bar (1021) is connected to the connector piece (1036), for example, by clipping thereto.

In assembling the support frame (1012) the C-shaped end portion is inserted into a cavity in the connector piece (1036) such that it substantially surrounds a shaft of the threaded knob (1032). Threaded knob (1032) is then turned until a shoulder portion (1033) thereof bears the C-shaped end portion of the support section (1028) into frictional engagement with the connector piece (1036).

Figure 10D:
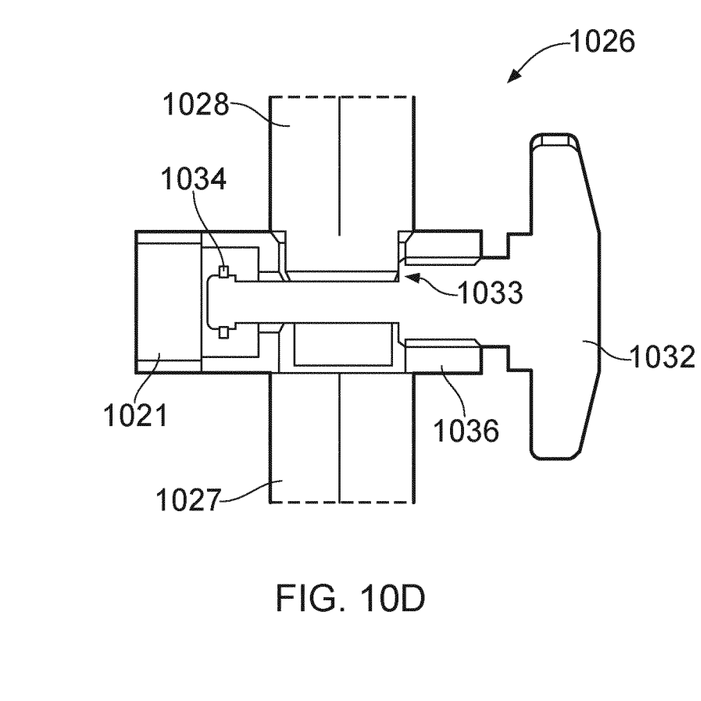

FIG. 10D shows a cross section of the releasable coupling (1026) of FIG. 10C in a locked position. This occurs when a user tightens the threaded knob (1032) such that the shoulder portion (1033) presses against the C-shaped end portion of the support section (1028).

Figure 10E:
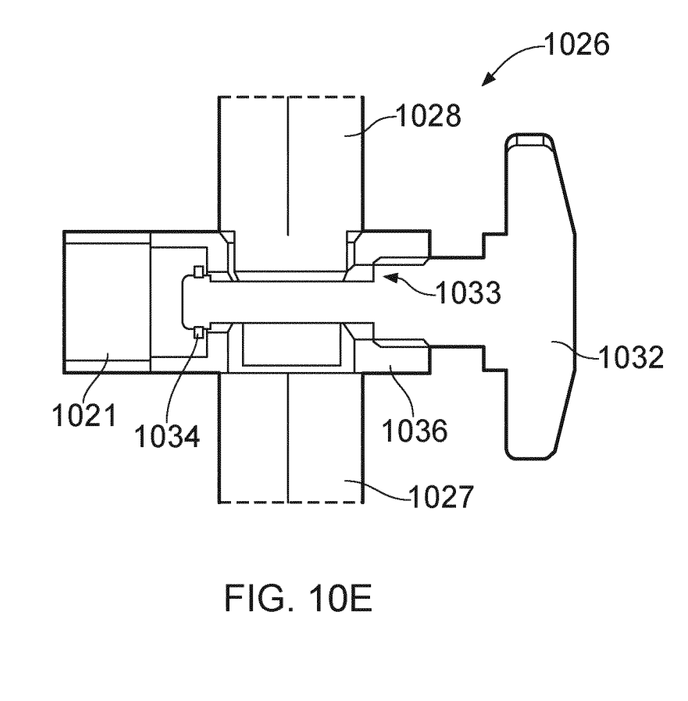

FIG. 10E shows a cross section of the releasable coupling (1026) of FIG. 10C in an open position where the threaded knob (1032) has been unscrewed away from the connector piece (1036). The threaded knob (1032) is prevented from being extracted from the connector piece (1036) by way of an annular stop (1034).

Although the releasable couplings have been described in relation to a specific embodiment, those skilled in the art will be aware that various alternative forms of releasable coupling may be provided. For example, various embodiments could be provided incorporating quick-release mechanisms using spring-loaded pull-to-release couplings.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:
1. A system comprising:
   a reactor vessel comprising a reaction chamber, wherein the reaction chamber has a plurality of respective openings; and a probe support bar assembly mounted on the reactor vessel and a plurality of sensing probes mounted in a plurality of rows, wherein each sensing probe passes through one of the respective openings on the reaction chamber and wherein movement of the probe support bar assembly changes an angle of inclination of the plurality of sensing probes, wherein the probe support bar assembly comprises:

a moveable part including a probe support bar mounted on one or more probe support legs;

a linear bush holder having an index plunger engageable with a plurality of holes; and a fixed part including a linear shaft holder having two or more linear rods for slideable engagement with the linear bush holder and the plurality of holes for holding the index plunger, wherein a height adjustment is provided by relative movement between the linear shaft holder and the linear bush holder, wherein the index plunger is mounted on the moveable part and the holes are affixed to the reactor vessel.

2. The system as claimed in claim 1, wherein the probe support bar assembly is height adjustable to provide said relative movement.

3. The system as claimed in claim 1, wherein the index plunger is disengaged from the linear shaft holder, and the linear shaft holder is moved down during mounting of a disposable bag.

4. The system as claimed in claim 1, wherein one of the one or more probe support legs is fixed within the linear bush holder by a recess and a pin.

5. The system as claimed in claim 1, wherein the probe support bar assembly comprises a spring mounted within a spring holder and positioned below a stopper plate wherein one of the one or more probe support legs is mounted on the stopper plate and a collar with a latch lever positioned around the stopper plate to enclose the one of the one or more probe support legs.

6. The system as claimed in claim 1, wherein one of the plurality of respective openings of the reaction chamber is perpendicular to a surface of the reaction chamber.

7. The system as claimed in claim 1, wherein the one of the plurality of respective openings of the reaction chamber is inclined to a surface of the reaction chamber.

8. The system as claimed in claim 7, wherein an inclined opening of the reaction chamber inserts a sensing end of one of the plurality of sensing probes to lower heights within the reaction chamber.

9. The system as claimed in claim 1, wherein the reaction chamber comprises a disposable bag.

10. The system of claim 1, wherein a plurality of probe support bars are configured to move relative to the probe support bar assembly.

* * * * *